US008341390B2

(12) United States Patent
Watanabe

(10) Patent No.: US 8,341,390 B2
(45) Date of Patent: Dec. 25, 2012

(54) COMPUTER SYSTEM AND METHOD FOR BACKING UP BIOS SETTINGS

(75) Inventor: Mitsuaki Watanabe, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 370 days.

(21) Appl. No.: 12/625,599

(22) Filed: Nov. 25, 2009

(65) Prior Publication Data
US 2010/0250910 A1 Sep. 30, 2010

(30) Foreign Application Priority Data

Mar. 24, 2009 (JP) .................................. 2009-071137

(51) Int. Cl.
*G06F 9/00* (2006.01)
*G06F 9/24* (2006.01)
*G06F 15/177* (2006.01)
*G06F 11/00* (2006.01)
(52) U.S. Cl. .................... 713/2; 713/1; 713/100; 714/15
(58) Field of Classification Search ........................ None
See application file for complete search history.

(56) References Cited

U.S. PATENT DOCUMENTS

| 6,678,741 | B1 * | 1/2004 | Northcutt et al. ............. 709/248 |
| 6,944,758 | B2 * | 9/2005 | Lin ................... 713/2 |
| 7,000,101 | B2 * | 2/2006 | Wu et al. ........................ 713/1 |
| 7,827,394 | B2 * | 11/2010 | Brown et al. ..................... 713/1 |
| 2005/0039081 | A1 * | 2/2005 | Chang et al. .................... 714/36 |
| 2006/0225067 | A1 * | 10/2006 | Yang ............................. 717/168 |
| 2007/0294575 | A1 * | 12/2007 | Aichelen et al. ................ 714/13 |
| 2008/0288557 | A1 * | 11/2008 | Chiu ............................. 707/202 |
| 2008/0288767 | A1 * | 11/2008 | Wang et al. ....................... 713/2 |

FOREIGN PATENT DOCUMENTS

| JP | 11-085628 | 3/1999 |
| JP | 2000-181687 | 6/2000 |
| JP | 2000-322298 | 11/2000 |
| JP | 2003-345871 | 12/2003 |
| JP | 2004-302991 | 10/2004 |
| JP | 2008-052354 | 3/2008 |

OTHER PUBLICATIONS

JP Office Action for Japanese Application No. 2009-071137, issued on Oct. 2, 2012.

* cited by examiner

*Primary Examiner* — Ji H Bae
(74) *Attorney, Agent, or Firm* — Antonelli, Terry, Stout & Kraus, LLP.

(57) ABSTRACT

In a computer system including a server having a BIOS and a management module, the server includes therein a memory area and a server controller, and the management module includes therein a backup memory area and a management-module controller. When the BIOS changes the BIOS setting, the BIOS stores the BIOS setting into both of the memory area and the backup memory area by way of the server controller and the management-module controller. Here, the management module operates independently of the server. Accordingly, when a BIOS-setting read request is issued from the outside, the management-module controller makes the response to the request source by reading the data stored into the backup memory area.

12 Claims, 10 Drawing Sheets

FIG.3

| | |
|---|---|
| PXE BOOT | ENABLE |
| WakeONLAN | DISABLE |
| SYSTEM AFTER AC BACK | Pre - State |
| BIOS PASSWORD | XXXXXXXX |
| BOOT ORDER | 1 : FD<br>2 : CD<br>3 : HDD |
| ⋮ | ⋮ |

| HEADER FIELD | RESTORE FLAG | ON |
|---|---|---|
| BIOS SETTING FIELD | PXE BOOT | ENABLE |
| | WakeONLAN | DISABLE |
| | SYSTEM AFTER AC BACK | Pre - State |
| | BIOS PASSWORD | XXXXXXXX |
| | BOOT ORDER | 1 : FD<br>2 : CD<br>3 : HDD |
| | ⋮ | ⋮ |

202

COMPUTER SYSTEM AND METHOD FOR BACKING UP BIOS SETTINGS

INCORPORATION BY REFERENCE

The present application claims priority from Japanese application JP2009-071137 filed on Mar. 24, 2009, the content of which is hereby incorporated by reference into this application.

BACKGROUND OF THE INVENTION

1. Field of the Invention

The present invention relates to a setting storage method in a computer system including at least one or more servers.

2. Description of the Related Art

In recent years, there has been a skyrocketing expansion in the prevalence of PC servers whose costs are lower as compared with those of mainframes and UNIX® servers. Also, the use of these PC servers is now being promoted even in mission-critical environments. This trend requires implementation of the PC servers which can exhibit high availability despite the fact that their costs are lower. What can be mentioned as the methods for enhancing the availability of a PC server are, e.g., redundant configuration of the parts, and replacement of the parts in operation. In a case where the PC server itself fails, however, the redundant configuration of the parts is meaningless. Accordingly, in a system for which the high availability is requested, redundant configuration of the PC server itself, and quick replacement and recovery of the server at the time of its failure become absolutely necessary.

Here, consideration is given to the case where the redundant configuration of servers is implemented, and where a currently-used server in operation fails. Then, when the currently-used failing server is automatically recovered back to a backup server which is prepared as the backup, a setting for the server at the point-in-time of its failure is required to be taken over to the backup server. Also, when the failing server is replaced by a new server, the setting for the server at the point-in-time of its failure is also required to be taken over to the new server after the replacement. In either case, the setting for the server at the point-in-time of its failure is required to be backed up in advance.

As the backup schemes, there have been known the scheme of making the backup manually, and the scheme of making the backup automatically. In the scheme of making the backup manually, there is the following danger: Namely, if the user forgot to make the backup after making a change in the setting, the user will find it impossible to recover the data. In view of this situation, in order to maintain the high availability, it is desirable that the server be equipped with the scheme of making the backup automatically.

The above-described setting for the server includes, e.g., a setting for the BIOS. The BIOS starts to operate with a timing with which the server boots up, and terminates when processings are over. Reading out the setting for the BIOS after these processings are over generally requires the use of a special OS or application. In many cases, however, the special OS or application like this turns out to be in an exclusive relationship with the OS or applications that should essentially be operated on the server. In view of this situation, considering from the aspect of operation's convenience, it is undesirable to carry out the backup by employing the scheme of using the special OS or application. This fact requires that, in the case of storing the setting for the BIOS, the BIOS itself back up the setting for the BIOS into another memory area using some method or other.

Several methods have been disclosed concerning the scheme of backing up the setting for the BIOS without using the special OS or application. For example, in JP-A-11-85628, the disclosure has been made concerning the scheme of periodically backing up the setting for the BIOS into a removal storage. Also, JP-A-2008-052354 and JP-A-2004-302991 (corresponding to U.S. Pat. No. 6,944,758) have disclosed the scheme of storing the setting for the backup inside the server.

SUMMARY OF THE INVENTION

In the scheme disclosed in JP-A-11-85628, however, there is none of the following guarantee: Namely, if the server fails during a time-period after making a change in the BIOS setting until making its backup, the backup contents remain the newest. Also, when the server fails or has been removed, the storage can be taken out manually. There exists none of a method, however, which allows the BIOS setting to be read out directly from external software or the like. Also, in the scheme of storing the setting for the backup inside the server, which is disclosed in JP-A-2008-052354 and JP-A-2004-302991, the backup setting cannot be taken out when the server fails or has been removed.

An object of the present invention is to make it possible to automatically back up a BIOS setting for a server without using a special OS or application, and to read the backup data from the outside even in a state where the server fails or has been removed.

In order to accomplish the above-described object, there is provided a computer system according to the present invention, including a management module, and at least one server, wherein the server includes a CPU, a memory, a BIOS, a setting management unit connected to the BIOS, and a memory area, the management module including a BIOS-request management unit connected to the setting management unit, and a backup memory area.

Moreover, the BIOS outputs, to the setting management unit, a BIOS-setting storage request for storing a BIOS setting, the setting management unit storing the BIOS setting into the memory area in accordance with the BIOS-setting storage request inputted therein, and outputting, to the BIOS-request management unit, a BIOS-setting setting backup request for backing up the BIOS setting, the BIOS-request management unit outputting a setting write request for storing the BIOS setting into the backup memory area in accordance with the BIOS-setting setting backup request inputted therein, and the backup memory area being caused to store the BIOS setting therein.

Namely, when the BIOS changes the BIOS setting, the BIOS stores the BIOS setting into both of the memory area and the backup memory area by way of a server controller and a management-module controller. Here, the management module operates independently of the server. Accordingly, even if the server fails or has been removed, the value stored into the backup memory area is retained. Furthermore, when a BIOS-setting read request is issued from the outside, the management-module controller makes the response to the request source by reading the data stored into the backup memory area.

According to the present invention, it becomes possible to automatically back up the BIOS setting into the backup memory area inside the management module without using a special OS or application, and to read the backup data from the outside even in the state where the server fails or has been removed.

BRIEF DESCRIPTION OF THE DRAWINGS

FIG. 3 illustrates data format within a memory area;

FIG. 4 illustrates data format within a backup memory area;

DETAILED DESCRIPTION OF THE INVENTION

[1st Embodiment]

Figure 1:
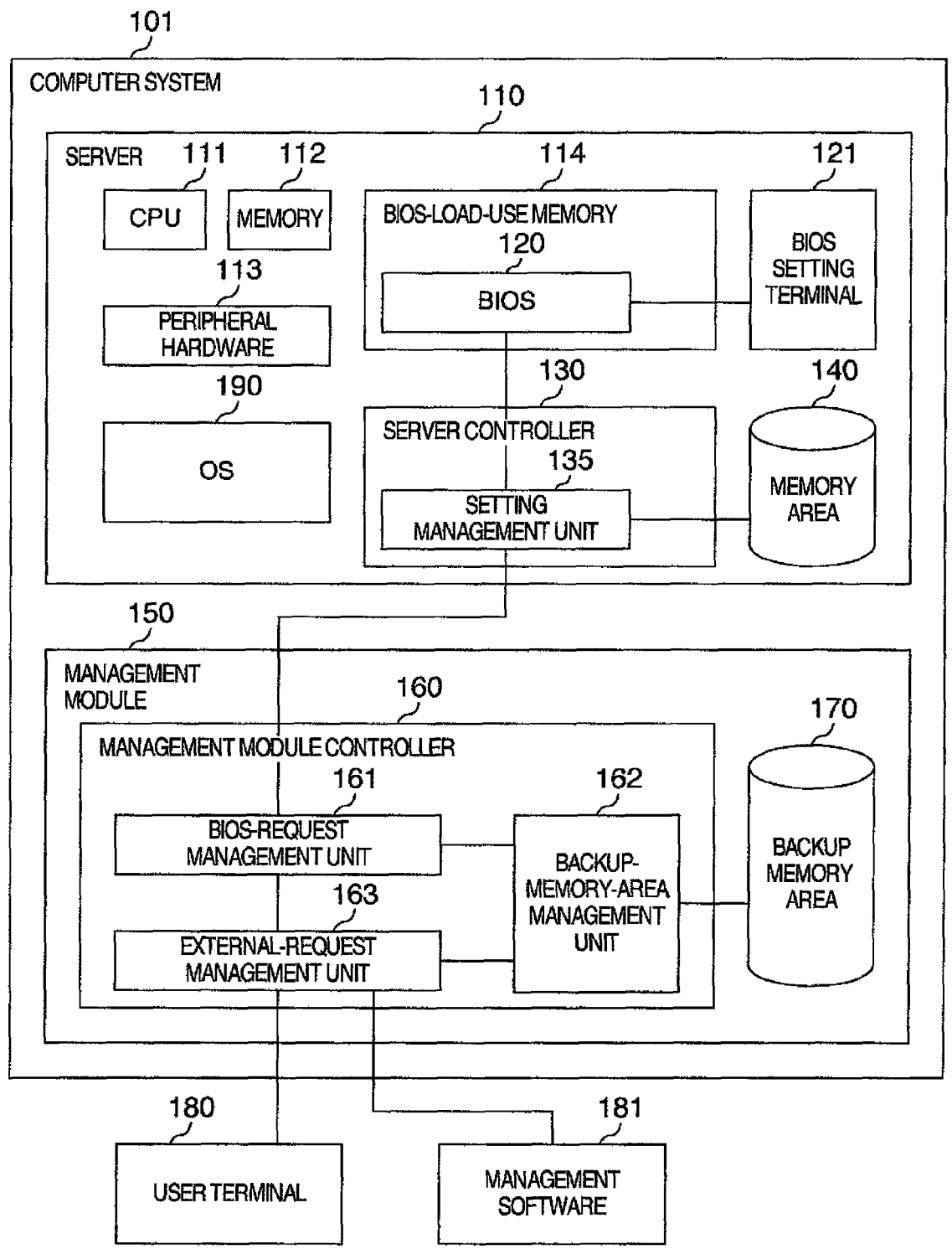
FIG. 1 illustrates an entire configuration diagram of a first embodiment according to the present invention.

FIG. 1 illustrates an entire configuration diagram of a first embodiment according to the present invention. A computer system 101 includes therein a server 110 and a management module 150.

The server 110 includes therein a CPU 111, a memory 112, a peripheral hardware 113, a BIOS-load-use memory 114, a BIOS setting terminal 121, a server controller 130, and a memory area 140.

A BIOS 120 is stored into the BIOS-load-use memory 114. The BIOS 120 is loaded at the time of booting up the server, then carrying out the controls over the CPU 111, the memory 112, and the peripheral hardware 113. The setting for the BIOS 120 can be changed from the BIOS setting terminal 121. The setting for the BIOS 120 is stored into the memory area 140.

The server controller 130 includes a setting management unit 135. The server controller 130 is implemented using, e.g., a BMC (: Baseboard Management Controller). The setting management unit 135 is made accessible to the memory area 140. The server controller 130 is made operable independently of the BIOS 120. The BIOS 120 and the server controller 130 are connected to each other inside the server. Accordingly, data transfer is made executable therebetween by way of the BIOS 120 and the setting management unit 135.

The management module 150 includes therein a management module controller 160 and a backup memory area 170. The management module controller 160 includes a BIOS-request management unit 161, a backup-memory-area management unit 162, and an external-request management unit 163.

The backup-memory-area management unit 162 is made accessible to the backup memory area 170. The server controller 130 and the management module controller 160 are connected to each other inside the computer system 101. Accordingly, data transfer is made executable therebetween by way of the setting management unit 135 and the BIOS-request management unit 161. A user terminal 180 and management software 181 are made connectable to the management module controller 160 by way of the external-request management unit 163.

Figure 2:
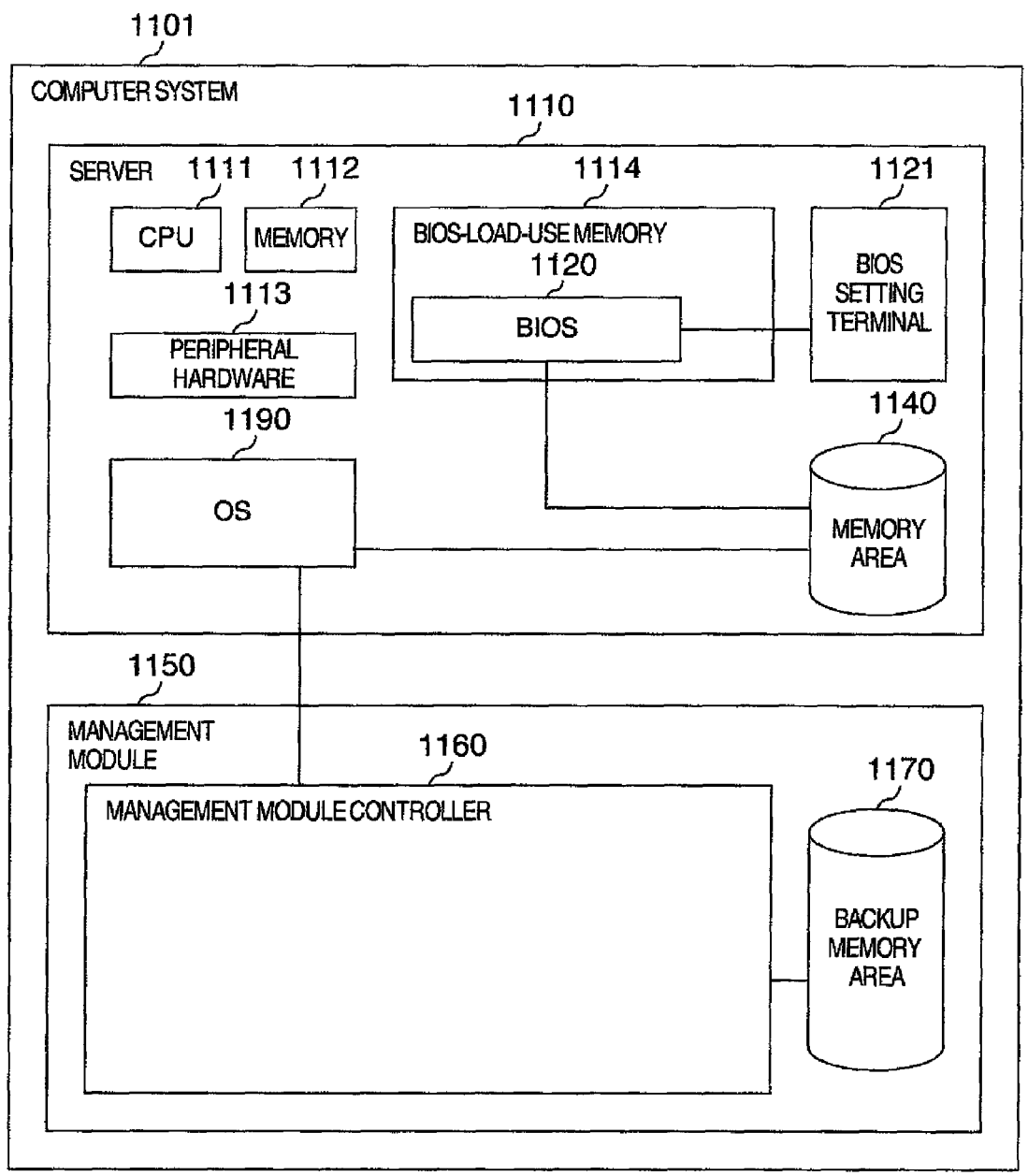
FIG. 2 illustrates a configuration example of the computer system which uses the conventional functions.

FIG. 2 illustrates the computer system which uses only the conventional technologies. In this computer system, when a BIOS 1120 stores the BIOS setting, the BIOS 1120 accesses a memory area 1140 directly. When compared with the computer system illustrated in FIG. 1 to which the present invention is applied, the computer system illustrated in FIG. 2 which uses the conventional technologies differs therefrom in a point that the server controller 130 including the setting management unit 135 does not exist.

The BIOS 1120 terminates the processing at a point-in-time when the boot-up of a server 1110 is completed. On account of this fact, after the completion of the server's boot-up, the data stored in the memory area 1140 cannot be read by way of the BIOS 1120. On account of this situation, in order for a management module 1150 to read the data stored in the memory area 1140 after the completion of the server's boot-up, the management module 1150 is required to read the data by way of an OS 1190 which has booted up on the server 1110. Nevertheless, if the OS 1190 is different from an OS which is going to operate on the server 1110 essentially, the data stored in the memory area 1140 cannot be read unless the OS which is going to operate on the server 1110 is halted temporarily, and the OS 1190 is booted. Thus, after rebooting the OS 1190, the data stored in the memory area 1140 is read therefrom and applied to a management module controller 1160 via the OS 1190. Namely, there exists a problem that the reboot of the OS 1190 becomes necessary.

In contrast thereto, in the computer system in the first embodiment, when the BIOS 120 stores the BIOS setting, the BIOS 120 automatically stores the back up into the backup memory area 170 as well as the memory area 140 by way of the server controller 130 and the management module controller 160. Namely, the back up of the setting for the BIOS can be stored into the outside of the server by way of none of the OS 190. This accomplishment solves the above-described problem of the conventional-technologies computer system illustrated in FIG. 2.

Moreover, in the computer system in the first embodiment, the following functions are executable for the external-request management unit 163 from the user terminal 180 or the management software 181: A read function sequence for reading the backup setting from the backup memory area, a write function sequence for writing the backup setting into the backup memory area, and a setting-restore function sequence using the backup setting stored in the backup memory area. These sequences will be described later.

Next, the explanation will be given below concerning data to be used in the computer system in the first embodiment. FIG. 3 illustrates format for the BIOS setting to be stored into the memory area 140. This format includes data such as setting parameters of the respective hardware controlled by the BIOS 120. The contents illustrated in FIG. 3 are quite general setting examples. Accordingly, the details of the present contents do not depend on the present invention.

FIG. 4 illustrates format for the BIOS backup setting to be stored into the backup memory area 170. The BIOS backup setting includes a BIOS setting field 202 and a header field 201. The BIOS setting field 202 is completely the same format as the one stored into the memory area 140. The header field 201 includes a restore flag 203. The restore flag 203, which assumes values of ON and OFF, is used for the controls over the backup from the server and the restore from the outside. The control method for the present restore flag will be described later.

Figure 5:
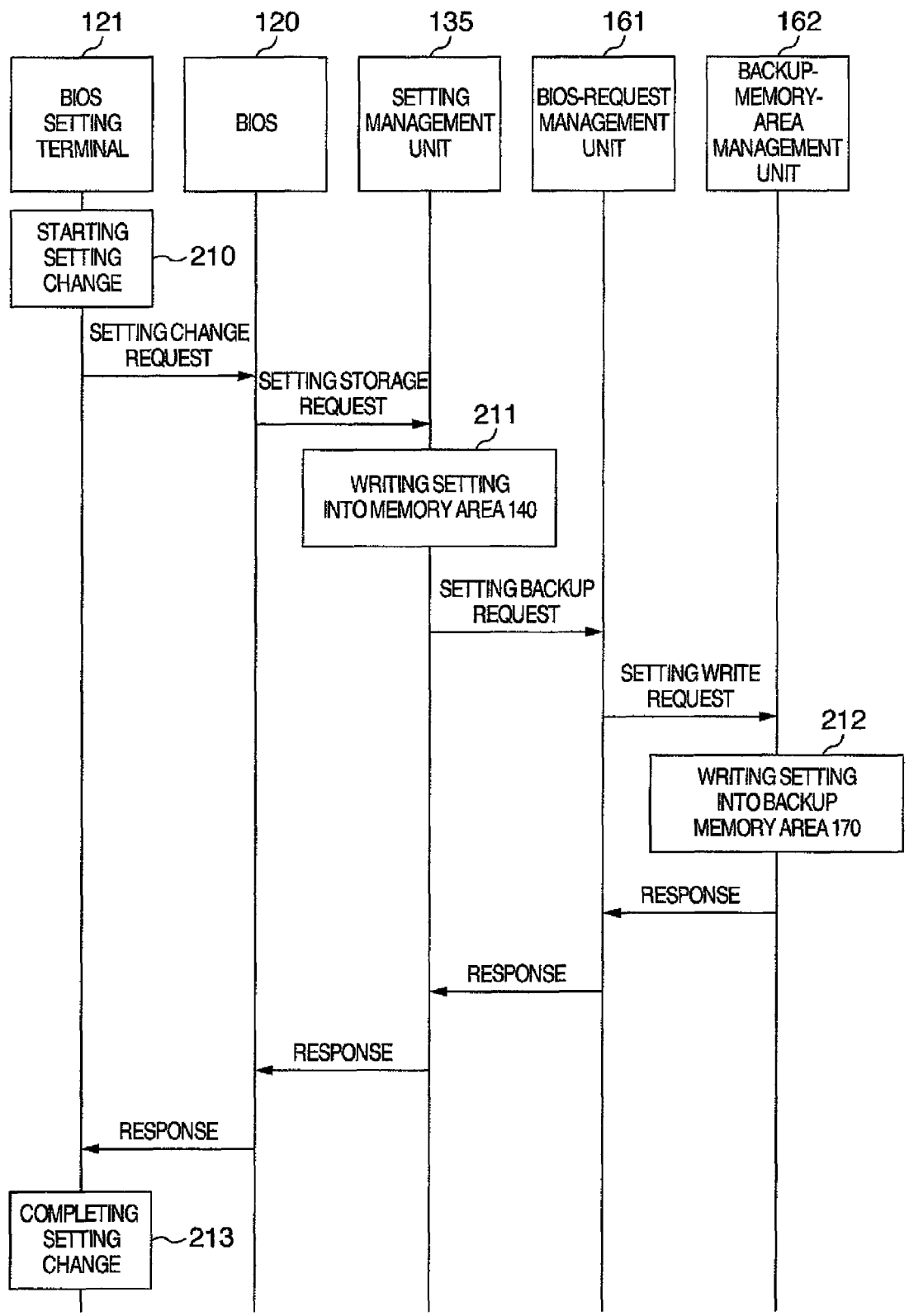
FIG. 5 illustrates a BIOS-setting storage sequence at the time when the BIOS setting for the server is changed.

FIG. 5 illustrates a BIOS-setting storage sequence at the time when the BIOS setting for the server is changed. When a setting change is carried out from the BIOS setting terminal 121 (step 210), the BIOS setting terminal 121 issues a setting change request to the BIOS 120. Having received the setting change request, the BIOS 120 issues a setting storage request to the setting management unit 135.

Having received the setting storage request, the setting management unit 135 carries out writing of the BIOS setting into the memory area 140 (step 211). After that, the setting management unit 135 issues a setting backup request to the BIOS-request management unit 161. Having received the setting backup request, the BIOS-request management unit 161 issues a setting write request to the backup-memory-area management unit 162.

Having received the setting write request, the backup-memory-area management unit 162 carries out writing of the BIOS setting into the backup memory area 170 (step 212). At a point-in-time when the writing into the backup memory area 170 has been completed, the backup-memory-area management unit 162 returns the responses sequentially.

At a point-in-time when the BIOS setting terminal 121 has received the responses sequentially sent from the backup-memory-area management unit 162, the BIOS setting terminal 121 displays thereon a notice for notifying that the setting change has been completed (step 213).

Figure 6:
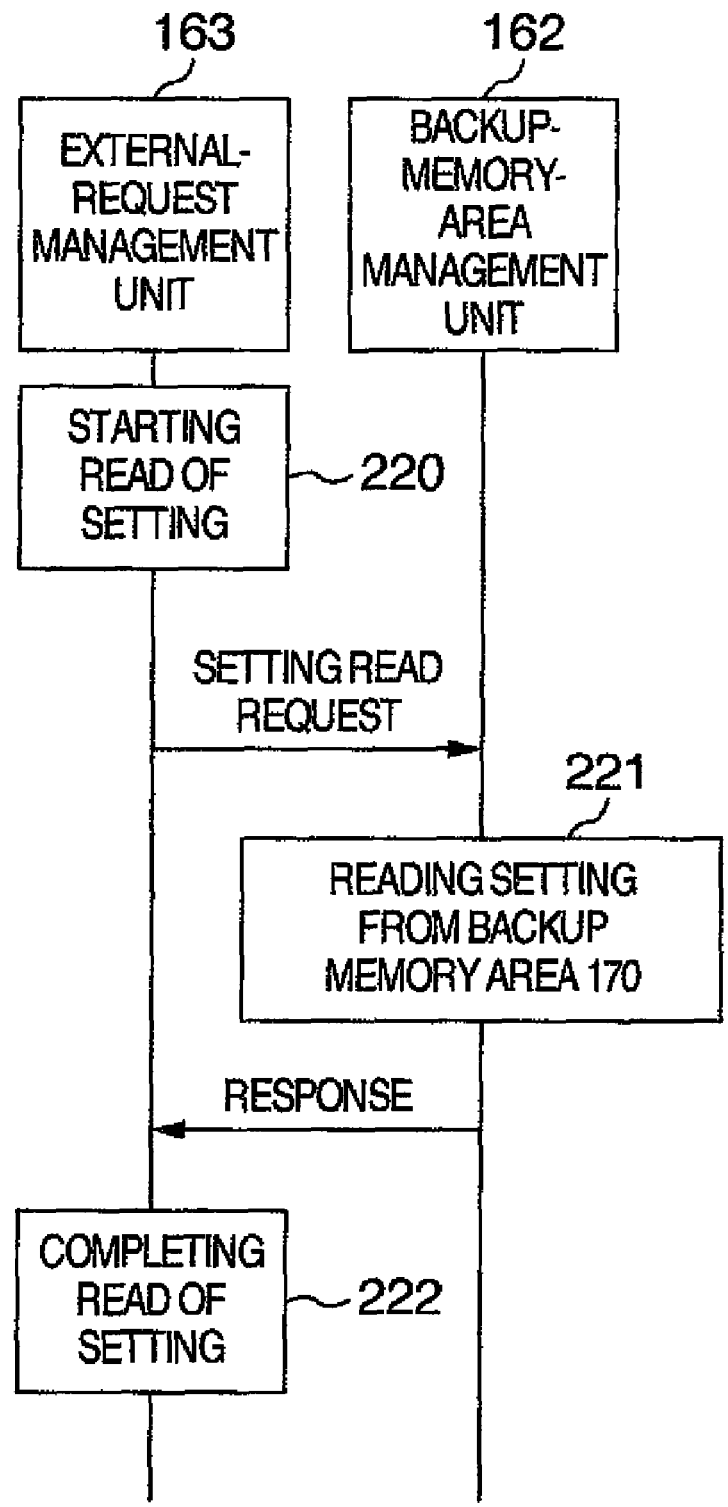
FIG. 6 illustrates a read function sequence for reading the backup setting from the backup memory area.

FIG. 6 illustrates the read function sequence for reading the backup setting from the backup memory area. Having received a setting read request from the user terminal 180 or the management software 181 (step 220), the external-request management unit 163 issues the setting read request to the backup-memory-area management unit 162.

Having received the setting read request, the backup-memory-area management unit 162 reads the backup setting stored in the backup memory area 170 (step 221), then making the response to the external-request management unit 163.

Having received the response from the backup-memory-area management unit 162, the external-request management unit 163 makes the response on the read backup setting to the user terminal 180 or the management software 181 (step 222). Since the management module 150 operates independently of the server 110, the management module 150 finds it possible to carry out the reading of the backup setting even if the server fails or has been removed.

Figure 7:
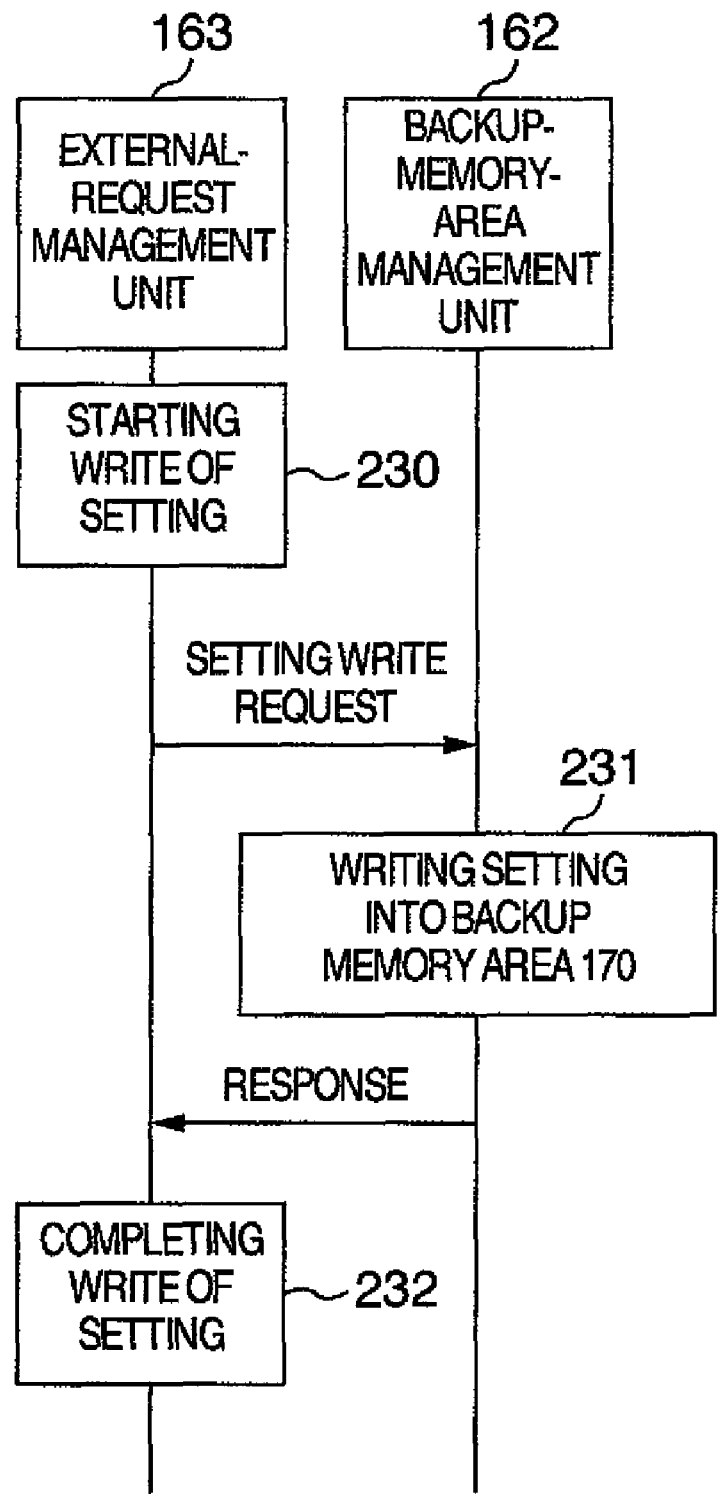
FIG. 7 illustrates a write function sequence for writing the backup setting into the backup memory area.

FIG. 7 illustrates the write function sequence for writing the backup setting into the backup memory area. Having received a setting write request from the user terminal 180 or the management software 181 (step 230), the external-request management unit 163 issues the setting write request to the backup-memory-area management unit 162.

Having received the setting write request, the backup-memory-area management unit 162 writes the backup setting into the backup memory area 170 (step 231), then making the response to the external-request management unit 163.

Having received the response from the backup-memory-area management unit 162, the external-request management unit 163 makes the response to the user terminal 180 or the management software 181, thereby notifying that the writing has been completed (step 232).

Figure 8:
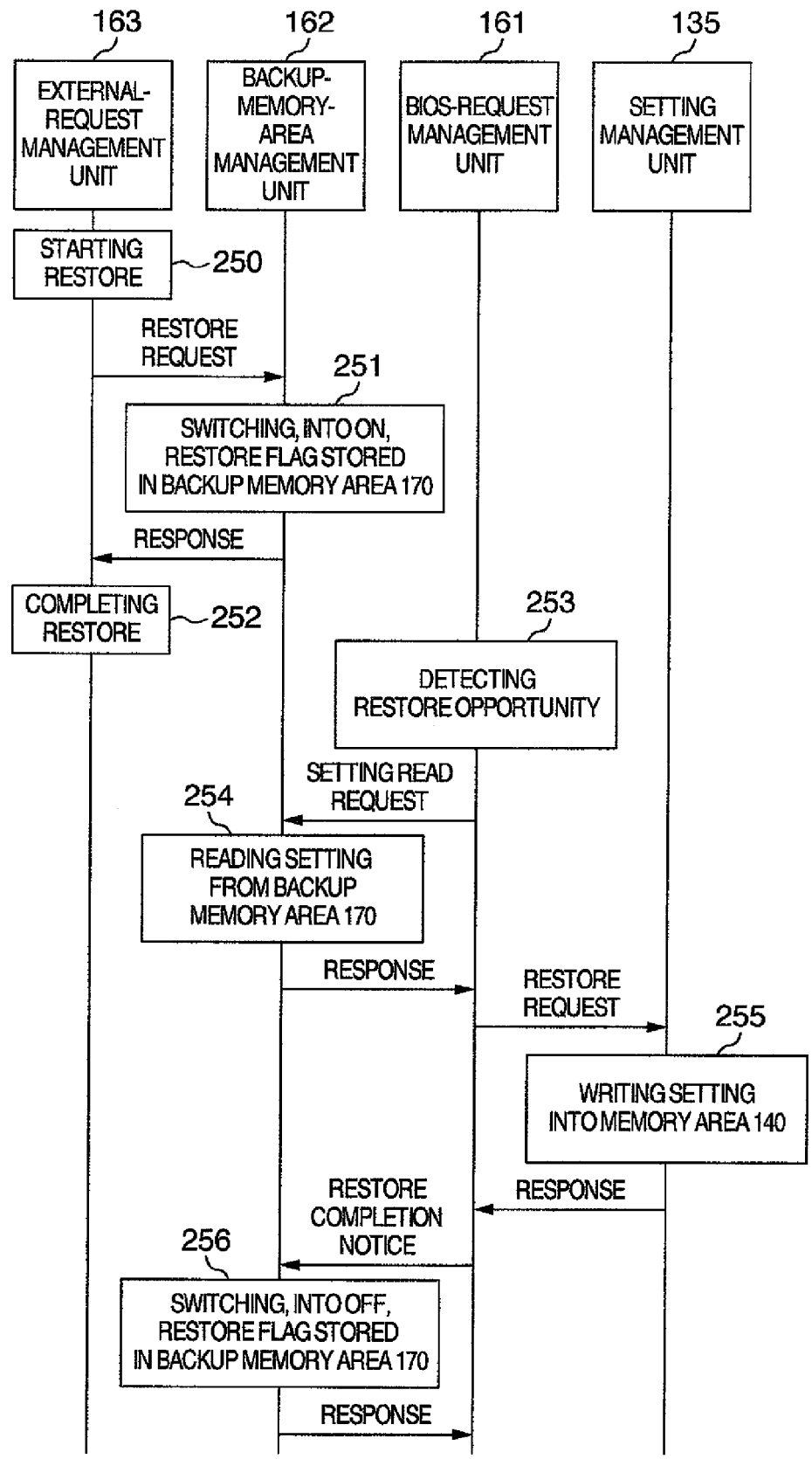
FIG. 8 illustrates a setting-restore function sequence using the backup setting stored in the backup memory area.

FIG. 8 illustrates the setting-restore function sequence using the backup setting stored in the backup memory area. Having received a setting restore request from the user terminal 180 or the management software 181 (step 250), the external-request management unit 163 issues the setting restore request to the backup-memory-area management unit 162.

Having received the setting restore request, the backup-memory-area management unit 162 switches, into ON, the restore flag 203 stored in the backup memory area 170 (step 251), then making the response to the external-request management unit 163.

Having received the response from the backup-memory-area management unit 162, the external-request management unit 163 makes the response to the user terminal 180 or the management software 181, thereby notifying that the unit 163 has accepted the setting restore request (step 252).

Figure 9:
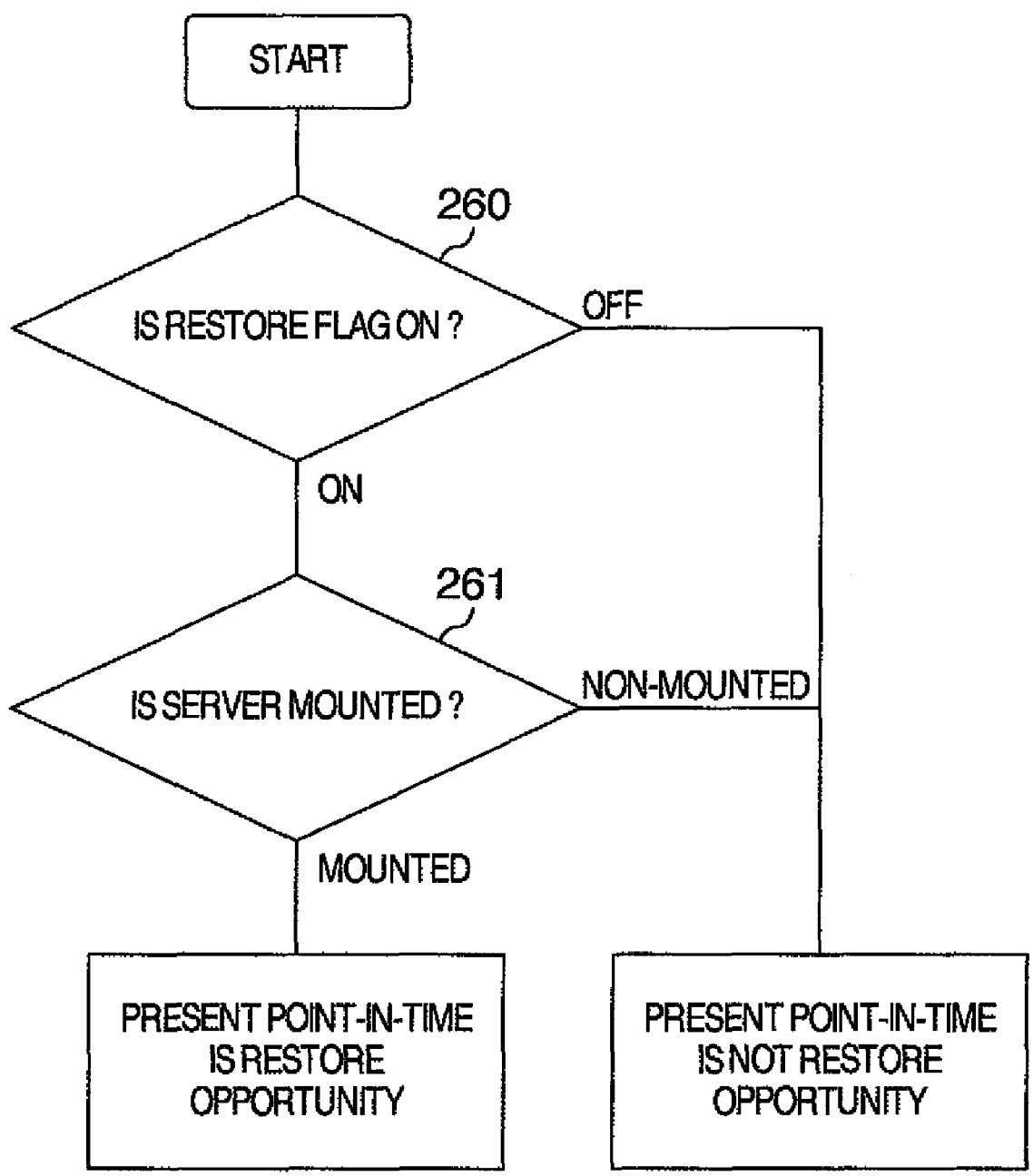
FIG. 9 illustrates a restore-opportunity judgment flow of a BIOS-request management unit.

In accordance with a flowchart illustrated in FIG. 9, the BIOS-request management unit 161 periodically checks whether or not the present point-in-time is a restore opportunity. In a case where the restore flag is ON (judgment 260), and where the server is mounted (judgment 261), the unit 161 judges that the present point-in-time is the restore opportunity. If the setting restore request comes into the management module in a case where the server is not mounted, it turns out that the restore will be carried out at a point-in-time when the server is mounted.

When the BIOS-request management unit 161 has detected the restore opportunity (step 253), the unit 161 issues a setting read request to the backup-memory-area management unit 162. Having received the setting read request, the backup-memory-area management unit 162 reads the backup setting stored in the backup memory area 170 (step 254), then making the response to the BIOS-request management unit 161.

Having received the response from the backup-memory-area management unit 162, the BIOS-request management unit 161 issues a setting restore request to the setting management unit 135 on the basis of the read backup setting. Having received the setting restore request, the setting management unit 135 writes the backup setting into the memory area 140 (step 255), then making the response to the BIOS-request management unit 161.

Having received the response from the setting management unit 135, the BIOS-request management unit 161 issues a restore completion notice to the backup-memory-area management unit 162.

Having received the restore completion notice, the backup-memory-area management unit 162 switches, into OFF, the restore flag 203 stored in the backup memory area 170 (step 256), then making the response to the BIOS-request management unit 161.

The execution of the above-described sequence allows the setting stored in the backup memory area 170 to be restored into the memory area 140. The setting restored into the memory area 140 is read with a timing with which the BIOS 120 is booted up next time. Thereinafter, the BIOS 120 starts its operation in accordance with this setting.

Figure 10:
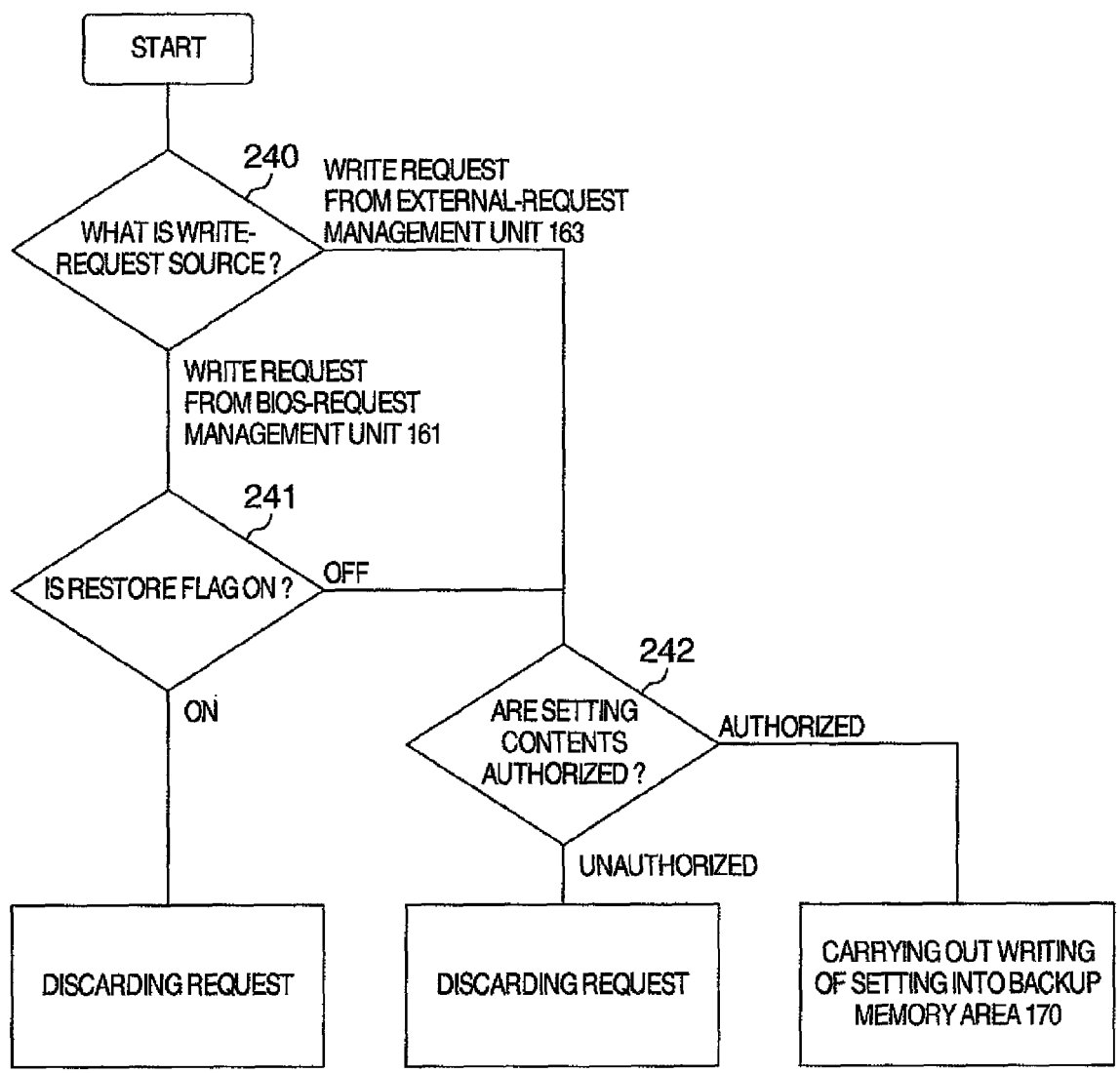
FIG. 10 illustrates a write-request judgment flow of a backup-memory-area management unit into the backup memory area.

The backup-memory-area management unit 162 carries out the writing of the backup setting into the backup memory area 170 on the basis of the sequence at the time of changing the BIOS setting for the server and the sequence at the time of writing the backup setting into the backup memory area. At this time, in accordance with a flowchart illustrated in FIG. 10, the backup-memory-area management unit 162 suppresses a setting corruption caused by an unauthorized writing.

First, it is judged what the write-request source is (judgment 240). If the write request is the one issued from the BIOS-request management unit 161 (=the time of changing the BIOS setting for the server), it is checked whether or not the restore flag is ON (judgment 241). Here, if the restore flag is found to be ON, the ON restore flag indicates that the restore request has been issued from the outside. Accordingly, if the backup setting for the server stored in the backup memory area 170 is rewritten, the setting for which the restore request has been made from the outside will be lost. In view of this situation, the write request is discarded. Consequently, the writing of the setting into the backup memory area 170 will not be carried out.

Meanwhile, if the restore flag is found to be OFF, it is checked whether or not the setting contents are valid (judgment 242). The check for the validity of the setting contents can be made based on, e.g., coincidence of checksums. In the present embodiment, no mention will be made regarding the method for checking the validity. If the setting contents are regarded as being unauthorized, the write request is discarded. Consequently, the writing of the setting into the backup memory area 170 will not be carried out. Meanwhile, if the setting contents are found to be authorized, the writing of the setting into the backup memory area 170 will be carried out.

In the computer system in the first embodiment, the data restore function using the backup data stored in the backup memory area is taken advantage of. Taking advantage of this method allows the automatic restore to be executed using the backup data stored in the backup memory area after the server fails or has been replaced.

As having been explained so far, according to the computer system to which the present invention is applied, the BIOS 120 included in the server 110 and the BIOS-request management unit 161 included in the management module controller 160 of the management module 150 are connected to each other with the intervention of the setting management unit 135 included in the server controller 130. This configuration permits the reading and writing of the BIOS setting to be executed independently of the OS situation which is operating on the server. This accomplishment, further, makes it unnecessary to execute the operation of temporarily halting the OS on the server in order to read the BIOS setting like in the conventional computer system. Consequently, automatization of the collection of the BIOS settings becomes executable.

2nd Embodiment

A second embodiment is an example where the setting for a server at the point-in-time of its failure is automatically taken over to another server by combining the plural number of computer systems with each other which are explained in the first embodiment.

Figure 11:
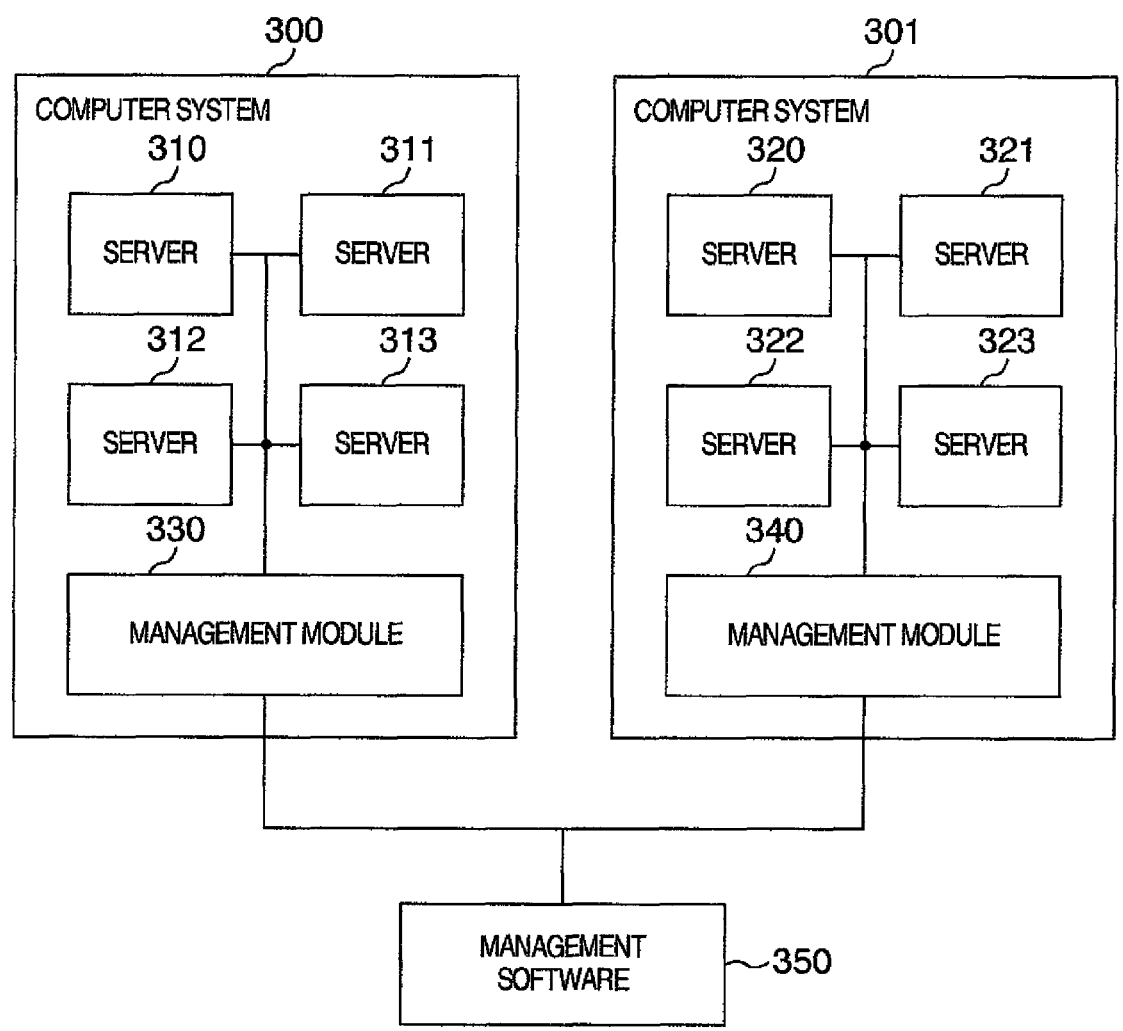
FIG. 11 illustrates an entire configuration diagram of a second embodiment according to the present invention.

FIG. 11 illustrates an entire configuration diagram of the system in the second embodiment. Computer systems 300 and 301 are the computer systems explained in the first embodiment. The computer system 300 includes therein four units of servers 310, 311, 312, and 313 and a management module 330. The computer system 301 includes therein four units of servers 320, 321, 322, and 323 and a management module 340.

Also, the management modules 330 and 340 are connected to a management software 350. Taking advantage of the read function for reading the backup setting from the backup memory area, the management software 350 retains the newest backup setting for each server. Moreover, a server, which becomes a backup, is defined in advance on the management software 350. Then, if whatever of the servers in operation fails, the backup setting retained in the management software 350 is restored into the backup server by taking advantage of the write function for writing the backup setting into the backup memory area and the data restore function using the backup data stored in the backup memory area. This restore operation allows the setting for the server to be taken over to the backup server when the server fails.

In the conventional computer system, the automatic collection of the BIOS settings has been impossible. This drawback has made it impossible to carry out the take-over of the BIOS setting unless the collection of the BIOS settings had been carried out before the failure. According to the computer systems in the second embodiment to which the present invention is applied, however, the automatization of the collection of the BIOS settings has been made implementable. This feature guarantees that, when the server fails, it is possible to read the BIOS backup setting at the point-in-time of the failure. On account of this guarantee, it becomes possible to provide the computer system which permits the BIOS setting at the point-in-time of the failure to be taken over to the backup server without fail.

Namely, the setting is automatically taken over to another server when the server fails, thereby switching the operation to another server. Conventionally, the automatization of the collection of the settings has been impossible. This drawback has made it impossible to take over the setting unless the setting at the point-in-time of the failure had been collected, thereby resulting in the occurrence of a failure of the switching. According to the computer systems to which the present invention is applied, however, the collection of the BIOS settings has been automatized. This feature makes it possible to never fail to collect the setting at the point-in-time of the failure, thereby allowing the take-over of the setting to be executed without fail, and allowing the switching to be executed safely.

It should be further understood by those skilled in the art that although the foregoing description has been made on embodiments of the invention, the invention is not limited thereto and various changes and modifications may be made without departing from the spirit of the invention and the scope of the appended claims.

The invention claimed is

1. A computer system, comprising:
a management module; and
at least one server, wherein
said server comprises a BIOS, a setting management unit connected to said BIOS, and a memory area,
said management module comprising a BIOS-request management unit connected to said setting management unit, and a backup memory area,
said BIOS in said server outputting, to said setting management unit, a BIOS-setting setting storage request for storing a BIOS setting based on a BIOS setting change request,
said setting management unit
in said server storing said BIOS setting into said memory area in accordance with said BIOS-setting setting storage request inputted therein, and
outputting, to said BIOS-request management unit, a BIOS-setting setting backup request for backing up said BIOS setting,
said BIOS-request management unit in said management module outputting a BIOS-setting setting write request for storing said BIOS setting into said backup memory area in said management module in accordance with said BIOS-setting setting backup request inputted therein, and
said backup memory area being caused to store said BIOS setting therein.

2. The computer system according to claim 1, wherein said server further comprises a BIOS setting terminal for changing said BIOS setting, said BIOS setting terminal outputting, to said BIOS, said BIOS setting change request for changing said BIOS setting, said BIOS then outputting said BIOS-setting setting storage request to said setting management unit in accordance with said BIOS-setting setting change request inputted therein.

3. The computer system according to claim 1, wherein said management module further comprises a backup-memory-area management unit, said backup-memory-area management unit receiving said BIOS-setting setting write request for storing said BIOS setting into said backup memory area, said BIOS-setting setting write request being outputted from said BIOS-request management unit, and storing said BIOS setting into said backup memory area in accordance with said BIOS-setting setting write request received thereby.

4. The computer system according to claim 3, wherein said backup-memory-area management unit outputs a response to a BIOS setting terminal via said BIOS-request management unit, said setting management unit, and said BIOS when said storage of said BIOS setting into said backup memory area has been completed, said response indicating completion of said BIOS-setting storage, said BIOS setting terminal then displaying completion of said BIOS-setting storage on said BIOS setting terminal when said BIOS setting terminal has received said response indicating completion of said BIOS-setting storage.

5. The computer system according to claim 3, wherein said management module comprises said backup-memory-area management unit and an external-request management unit connected to an external appliance, said external-request management unit outputting a backup-setting setting read request to said backup-memory-area management unit, said backup-memory-area management unit reading said backup setting in accordance with said backup-setting setting read request inputted therein, said backup setting being stored in said backup memory area, and outputting said backup setting read thereby to said external-request management unit, said external-request management unit then outputting, to said external appliance, said read backup setting inputted therein.

6. The computer system according to claim 3, wherein said management module comprises said backup-memory-area management unit and an external-request management unit connected to an external appliance, said external-request management unit outputting a backup-setting setting write request to said backup-memory-area management unit, said backup-memory-area management unit writing said backup setting into said backup memory area in accordance with said backup-setting setting write request inputted therein, and outputting a response to said external-request management unit when said writing of said backup setting has been completed, said response indicating completion of said backup-setting writing, said external-request management unit then notifying said external appliance of completion of said backup-setting writing.

7. The computer system according to claim 3, wherein said management module comprises said backup-memory-area management unit and an external-request management unit connected to an external appliance, said external-request management unit outputting a BIOS-setting setting restore request to said backup-memory-area management unit, said backup-memory-area management unit affixing a restore flag to said BIOS setting in accordance with said BIOS-setting setting restore request inputted therein, said BIOS setting being stored in said backup memory area, said BIOS-request management unit outputting a BIOS-setting setting read request to said backup-memory-area management unit when present point-in-time is a restore opportunity, said backup-memory-area management unit reading said BIOS setting from said backup memory area, said restore flag is being affixed to said BIOS setting, and outputting said BIOS setting read to said BIOS-request management unit, said BIOS-request management unit outputting a BIOS-setting setting restore request to said setting management unit, said BIOS-setting setting restore request being based on said read BIOS setting inputted into said BIOS-request management unit, and said setting management unit storing said read BIOS setting into said memory area in accordance with said BIOS-setting setting restore request inputted therein from said BIOS-request management unit.

8. The computer system according to claim 7, wherein said BIOS-request management unit judges that said present point-in-time is said restore opportunity when said restore flag is affixed to said BIOS setting and when said server is mounted.

9. The computer system according to claim 1, wherein said setting management unit is included in a server controller, said server controller being a BMC (: Baseboard Management Controller).

10. A setting management method in a computer system, said computer system, comprising:

a management module; and at least one server, wherein said server comprises a BIOS, a setting management unit connected to said BIOS, and a memory area, said management module comprising a BIOS-request management unit connected to said setting management unit, and a backup memory area, said setting management method, comprising the steps of:

outputting, from said BIOS in said server to said setting management unit, a BIOS-setting setting storage request for storing a BIOS setting based on a BIOS setting change request, storing said BIOS setting into said memory area in accordance with said BIOS-setting setting storage request inputted into said setting management unit, outputting, to said BIOS-request management unit, a BIOS-setting setting backup request for backing up said BIOS setting, outputting a BIOS-setting setting write request for storing said BIOS setting into said backup memory area in said management module in accordance with said BIOS-setting setting backup request inputted into said BIOS-request management unit, and storing said BIOS setting into said backup memory area.

11. The setting management method according to claim 10, wherein
- said server further comprises a BIOS setting terminal for changing said BIOS setting,
- said setting management method, further comprising the steps of:
- outputting, from said BIOS setting terminal to said BIOS, said BIOS setting change request for changing said BIOS setting, and
- outputting said BIOS-setting setting storage request to said setting management unit in accordance with said BIOS setting change request inputted into said BIOS.

12. The setting management method according to claim 10, wherein
- said management module further comprises a backup-memory-area management unit,
- said setting management method, further comprising the steps of:
- outputting, from said BIOS-request management unit to said backup-memory-area management unit, said BIOS-setting setting write request for storing said BIOS setting into said backup memory area, and
- storing said BIOS setting into said backup memory area in accordance with said BIOS-setting setting write request received by said backup-memory-area management unit.

* * * * *